United States Patent
Bruhn et al.

(10) Patent No.: US 6,551,035 B1
(45) Date of Patent: Apr. 22, 2003

(54) TOOL FOR ROTARY CHIP REMOVAL, A TOOL TIP AND A METHOD FOR MANUFACTURING A TOOL TIP

(75) Inventors: Johnny Bruhn, Vasterfarnebo (SE); Mattias Puide, Fagersta (SE); Mikael Gronkvist, Norrkoping (SE)

(73) Assignee: Seco Tools AB, Fagersta (SE)

( * ) Notice: Subject to any disclaimer, the term of this patent is extended or adjusted under 35 U.S.C. 154(b) by 173 days.

(21) Appl. No.: 09/688,341

(22) Filed: Oct. 16, 2000

(30) Foreign Application Priority Data

Oct. 14, 1999 (SE) .............................. 9903685

(51) Int. Cl.[7] .............................................. B23B 51/02
(52) U.S. Cl. ...................... 408/144; 408/226; 408/231; 408/233; 408/713
(58) Field of Search .............................. 407/32, 34, 53, 407/54, 119; 408/59, 144, 145, 226, 227, 230, 231, 233, 713

(56) References Cited

U.S. PATENT DOCUMENTS

| | | | |
|---|---|---|---|
| 2,858,718 A | * 11/1958 | Kohler | 408/144 |
| 3,017,790 A | * 1/1962 | Werle | 408/144 |
| 3,336,614 A | * 8/1967 | Benjamin | 470/198 |
| 4,642,003 A | * 2/1987 | Yoshimura | 408/144 |
| 4,687,387 A | 8/1987 | Roos | |
| 4,813,823 A | * 3/1989 | Bieneck | 408/144 |
| 5,094,571 A | * 3/1992 | Ekerot | 408/144 |
| 5,947,660 A | 9/1999 | Karlsson et al. | |
| 5,957,631 A | * 9/1999 | Hecht | 408/144 |
| 5,988,953 A | 11/1999 | Berglund et al. | |
| 6,086,980 A | 7/2000 | Foster et al. | |
| 6,402,439 B1 | * 6/2002 | Puide et al. | 408/144 |

FOREIGN PATENT DOCUMENTS

| | | | |
|---|---|---|---|
| DE | 649627 | 8/1937 | |
| JP | 95506 A | * 4/1990 | 408/144 |
| JP | 92329 A | * 4/1993 | 408/144 |
| WO | WO99/00208 | 1/1999 | |

* cited by examiner

Primary Examiner—Daniel W. Howell
(74) Attorney, Agent, or Firm—Burns, Doane, Swecker & Mathis, LLP

(57) ABSTRACT

A rotary chip-removing tool includes a rotary tool body and a tool tip fastened on a front end thereof. The tool tip is formed of an injection molded body which has an integral cutting edge at its front end, and a coupling structure at its rear end. The coupling structure can be in the form of a threaded hole, or a rearward projection, for coupling the tool tip against the tool body. The tool tip is formed of first and second materials. The first material forms at least part of the cutting edge, and the second material forms the coupling structure. The first material is more brittle than the second material, and the second material is tougher than the first material.

17 Claims, 6 Drawing Sheets

TOOL FOR ROTARY CHIP REMOVAL, A TOOL TIP AND A METHOD FOR MANUFACTURING A TOOL TIP

BACKGROUND OF THE INVENTION

The present invention relates to a tool for rotary chip removal, comprising a tool body, a tool tip and means for fastening the tool tip to the tool body. The invention also relates to a tool tip per se, and to a method for manufacturing a tool tip.

PRIOR ART

It is previously known to use interchangeable cutting edges on different types of tools for chip removal. However this technique has practical limitations due to strength reasons when it comes to milling and drilling tools that rotate about longitudinal axes, since the cutting edges are subjected to variable cutting speed.

Through Karlsson et al. U.S. Pat. No. 5,947,660 there is previously known a drill with an injection molded releasable tool tip anchored in a tool body by means of a pull rod. A drawback with the known drill, as for most drills, is that its not optimized for variable cutting speed. In addition, the thread in the known drill tends to crack at high tension.

It is known, through for example, Foster et al. U.S. Pat. No. 6,086,980, to press a core and a surrounding tube of material powder in two steps. The material powder comprises tungsten carbide (WC) together with cobalt (Co), which is compressed between a stamp and a die and is subsequently sintered such that the binder metal melts and ties the carbides to form a tool for chip removing machining. The object of the known technique is to obtain two different properties depending on radial position in a solid body. Drawbacks with this technique are problems with cracks in the radially external portion or porosities in the radially inner portion.

OBJECTS OF THE INVENTION

The present invention has as one object to provide an embodiment of milling or drilling tools with interchangeable cutting edges, whereby said embodiment eliminates the problems of prior art tools.

Another object of the present invention is to provide a rigid tool, preferably for drilling or milling, where the radially external parts of the cutting edges, which are subjected to relatively high cutting speed, have better wear resistance than the radially inner parts of the cutting edges.

Another object of the present invention is to provide a tool, preferably for drilling or milling, where the radially inner parts of the cutting edges, which are subjected to relatively low cutting speed, have higher toughness than the radially external parts of the cuffing edges.

Another object of the present invention is to provide a tool, preferably for drilling or milling, where the risk for tool tip breakage is reduced.

Still another object of the present invention is to provide a tool tip with a thread that endures high tension.

Still another object of the present invention is to provide a method for manufacturing a tool tip from injection molded hard metal whereby the degree of freedom for geometrical appearance is substantially unlimited and whereby grinding work is reduced.

Still another object of the present invention is to provide a method for manufacturing a tool tip from injection molded hard metal whereby cracks and porosities are avoided.

SUMMARY OF THE INVENTION

The present invention relates to a rotary chip-removing tool which includes a tool tip including a body having a front end forming an integral cutting edge, and a rear end forming a support surface having a first coupling structure. The tool further comprises a rotary tool body defining an axis of rotation, with a second coupling structure disposed at a front end of the tool body in engagement with the first coupling structure for fastening the rear end of the tool tip against the front end of the tool body. A first portion of the tool tip possesses at least part of the cutting edge and is formed of a first material. A second portion of the tool tip possesses the first coupling structure and is formed of a second material. The first material is more brittle than the second material, and the second material is tougher than the first material.

The invention also relates to a tool tip for rotary chip removal. The tool tip comprises an injection molded body which defines a central axis of rotation and includes front and rear ends. The front end forms an integral cutting edge. The rear end includes a coupling structure adapted to couple the tool tip to a tool body. A first portion of the body possesses at least part of the cutting edge and is formed of a first material. A second portion of the body possesses the coupling structure and is formed of a second material. The first material is more brittle than the second material, and the second material is tougher than the first material.

The invention also relates to a method of manufacturing a tool tip comprised of a body defining a longitudinal axis of rotation and having front and rear ends. The front end forms an integral cutting edge, and the rear end includes a coupling structure adapted to couple the tool tip to a tool body. The method comprises the steps of A) providing a first heated mixture of a hard metal powder, a plastic binder, and a first amount of metallic binder;

B) injecting the first heated mixture into a first mold cavity;

C) allowing the first heated mixture to cool in the first mold cavity to form a core;

D) providing a second heated mixture of a hard metal powder, a plastic binder, and a second amount of metallic binder less than the first amount of metallic binder;

E) injecting the second heated mixture into a second mold cavity extending around the core;

F) allowing the second heated material to cool in the second mold cavity and adhere to the core; and G) sintering the core and the second material, wherein the core forms the coupling structure, and the second material forms at least part of the cutting edge.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION PREFERRED EMBODIMENTS OF THE INVENTION

Figure 1:
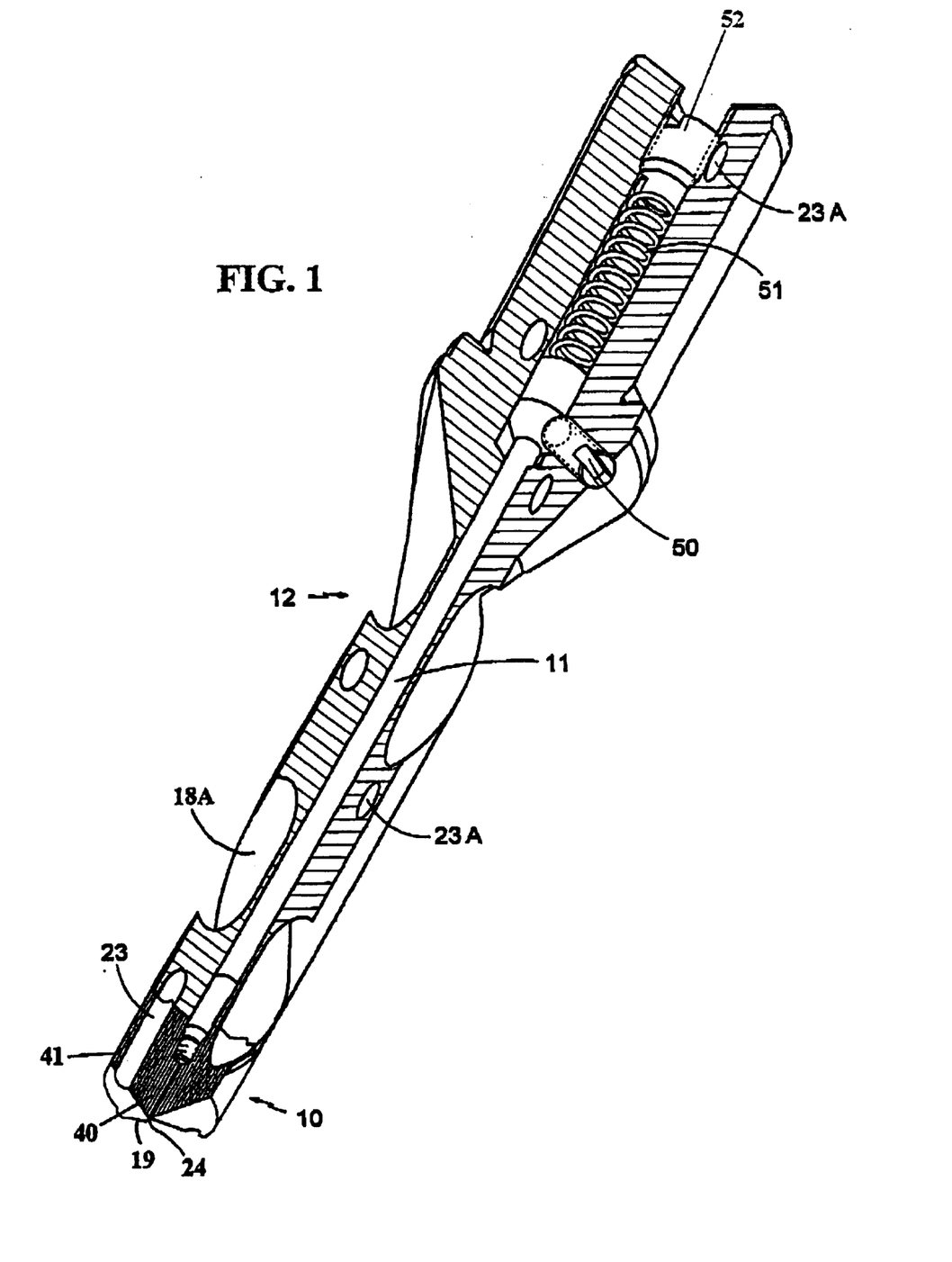
FIG. 1 shows a drilling tool according to the present invention, partly in section.

The embodiment in FIG. 1 of a tool according to the invention is a so called helix drill, which in this case includes a tool tip 10, a pull rod 11, a tool body 12, a locking screw 50, a spring 51 and a stop screw 52. With this tool it is possible to untighten and change the tool tip while the tool body is fixed in a machine. The drilling tool has also been described in Karlsson et al. U.S. Pat. No. 5,947,660, the disclosure of which is incorporated herein by reference.

As described in International Publication WO99/00208, the tool tip 10 is provided with at least one cutting edge 19 at the front end thereof facing away from the drill body 12, which edge is given a design depending on the area of application. Thus the cutting edge is, or the cutting edges are, substantially straight and parallel to the longitudinal center axis of the cutting portion when the tool tip is an end mill, whereas the cutting edges are circular when the tool tip is a ball nose end mill. The forward end of the cutting portion 10 in the figures shows an edge 19 for drilling the edge including a center chisel edge portion 24.

The tool tip 10 and the tool body 12 includes a rear end having a rearwardly facing support surface 22 and a forwardly facing front surface 14, respectively, configured in accordance with WO99/00208.

Figure 2:
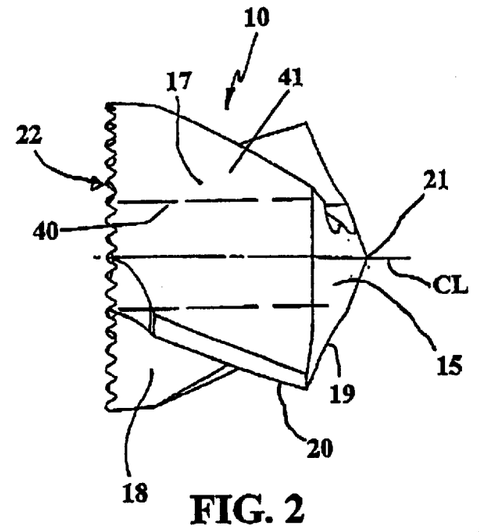
FIG. 2 shows a tool tip according to the present invention in a side view.
Figure 3:
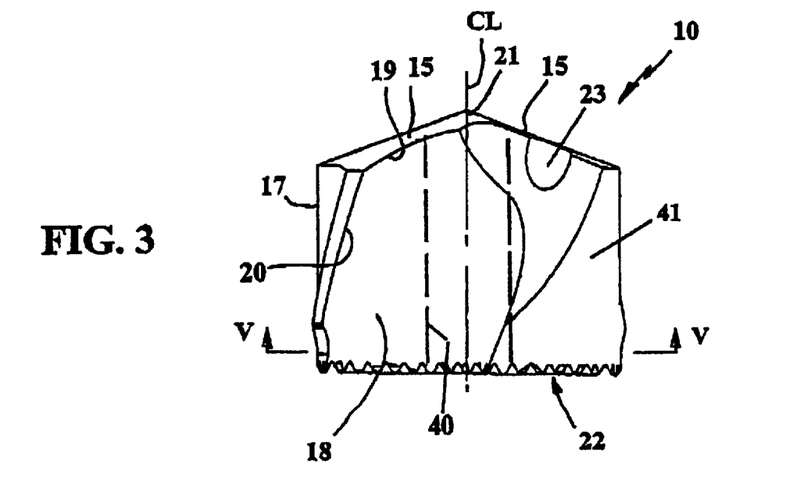
FIG. 3 shows the tool tip in another side view.

The tool tip 10 is made of injection molded hard metal. As is apparent from FIGS. 2–4 the tool tip comprises two upper clearance surfaces 15, the support surface 22, and first 17 and second 18 curved surfaces interconnecting the support surface 22 with respective ones of the clearance surfaces 15. All of these surfaces and connected edges are made of injection molded hard metal, preferably cemented carbide. Lines of intersection between the second curved surfaces (chip flutes) 18 and the clearance surfaces 15 define main cutting edges 19, preferably reinforced by chamfers, not shown. Lines of intersection between the first curved surfaces 17 and the chip flutes 18 form secondary cutting edges 20. The chip flutes may alternatively be adapted for a tool body with straight chip flutes. The biggest diameter of the tool tip is the diametrical distance between radial extreme points of the minor cutting edges 20. The height of the tool tip is substantially equal to the diameter. The biggest diameter of the support surface 22 is preferably smaller than the biggest diameter of the tool tip, so that a clearance can be obtained during machining. Flushing holes 23 can run substantially parallel with the central axis CL through the tool tip from the support surface 22 and terminate in the respective upper clearance surface 15. The flushing holes intersect a normal to the central axis CL at each side of the central axis.

Figure 4:
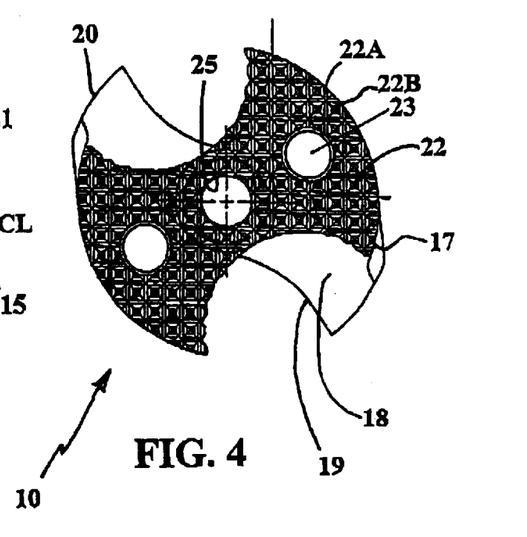
FIG. 4 shows the tool tip in a bottom view.

The support surface 22 has a circular basic shape and includes two groove parts 22A, 22B. Each groove part covers substantially the entire support surface 22 and comprises a number of mutually separate, identical flutes or grooves. The grooves in the groove parts have two main directions, which are perpendicular to each other. Substantially each groove in both groove parts 22A, 22B intersects the jacket surface of the holder at two places. Each groove is elongated and substantially v-shaped in cross-section. Each groove has two flanks which, via sharp or rounded transitions connect to a bottom, The flanks form an acute angle with each other. The angle lies in the interval of 40° to 80°, preferably 55° to 60°. Each flank is preferably planar and connects to the associated flank via an obtuse inner, soft or sharp, transition. The number of grooves in each groove part depends of how the front surface of the holder is formed and the number is chosen in the interval of 5 to 20 grooves.

The design of the groove parts 22A, 22B gives a considerably larger specific surface than if this surface were planar. The groove parts 22A, 22B cover at least 80%, preferably 90–100%, of the accessible area on the support surface 22. The support surface 22 is formed with a coupling structure in the form of a blind hole with an integral thread 25 that co-operates with a threaded free end of the pull rod 11. There is thus obtained the possibility to provide cutting edges extending towards the rotational axis for drilling. In the embodiment of FIG. 4 the groove parts 22A, 22B have been made through direct pressing and sintering or through grinding.

The tool body is provided with chip flutes 18a, which follow the protruding lands of the drill along a helical path at a distance from the central axis CL. The chip flutes 18a may extend along the entire body or along a part thereof. The chip flutes may alternatively be straight.

The front surface 14 of the tool body is configured to abut against the support surface 22 of the tool tip 10. The biggest diameter of the front surface is smaller than the biggest diameter of the tool tip but is preferably equal to the smallest diameter of the tool tip. The tool body 12 may be made of steel, hard metal or high speed steel and has flush channels 23A formed therein.

A rear end or shank portion of the tool body 12 is intended to be secured in a rotatable spindle (not shown) in a drill, and a hole 15A extends through the tool body. The pull rod is sized to project through the hole 15A. The front surface 14 has a circular basic shape and includes two groove parts 16A, 16B. Each groove part covers substantially half of the front surface 14 and includes number of mutually separate, identical flutes or grooves. The grooves in the groove parts have two main directions S1, S2, which are perpendicular to each other. A second groove part 16A is bordered by a first groove part 16B. Substantially each groove in that first groove part 16B intersects the jacket surface of the holder in two places, while substantially each groove in the second groove part 16A intersects the jacket surface of the holder in one place. Each groove is elongated as well as substantially v-shaped in cross-section. Each groove has two flanks which, via sharp or rounded transitions, connects to a bottom, and has a width W. The flanks form an acute angle with each other. The angle lies in the interval 40° to 80°, preferably 55° to 60°. Each flank is preferably planarly formed and connects to the associated flank via an obtuse inner, soft or sharp, transition. The number of grooves in each groove part depends on how the support surface of the tool tip is formed and the number is chosen in the interval 5 to 20 grooves. The bottom can alternatively be provided with a radius of about 0.2 to 0.4 mm. The design of the groove parts 16A, 16B gives a considerably bigger specific surface than if these surfaces were planar. The groove parts 16A, 16B cover at least 80%, preferably 90–100%, of the accessible area of the front surface 14.

Figures 8, 9, 10:
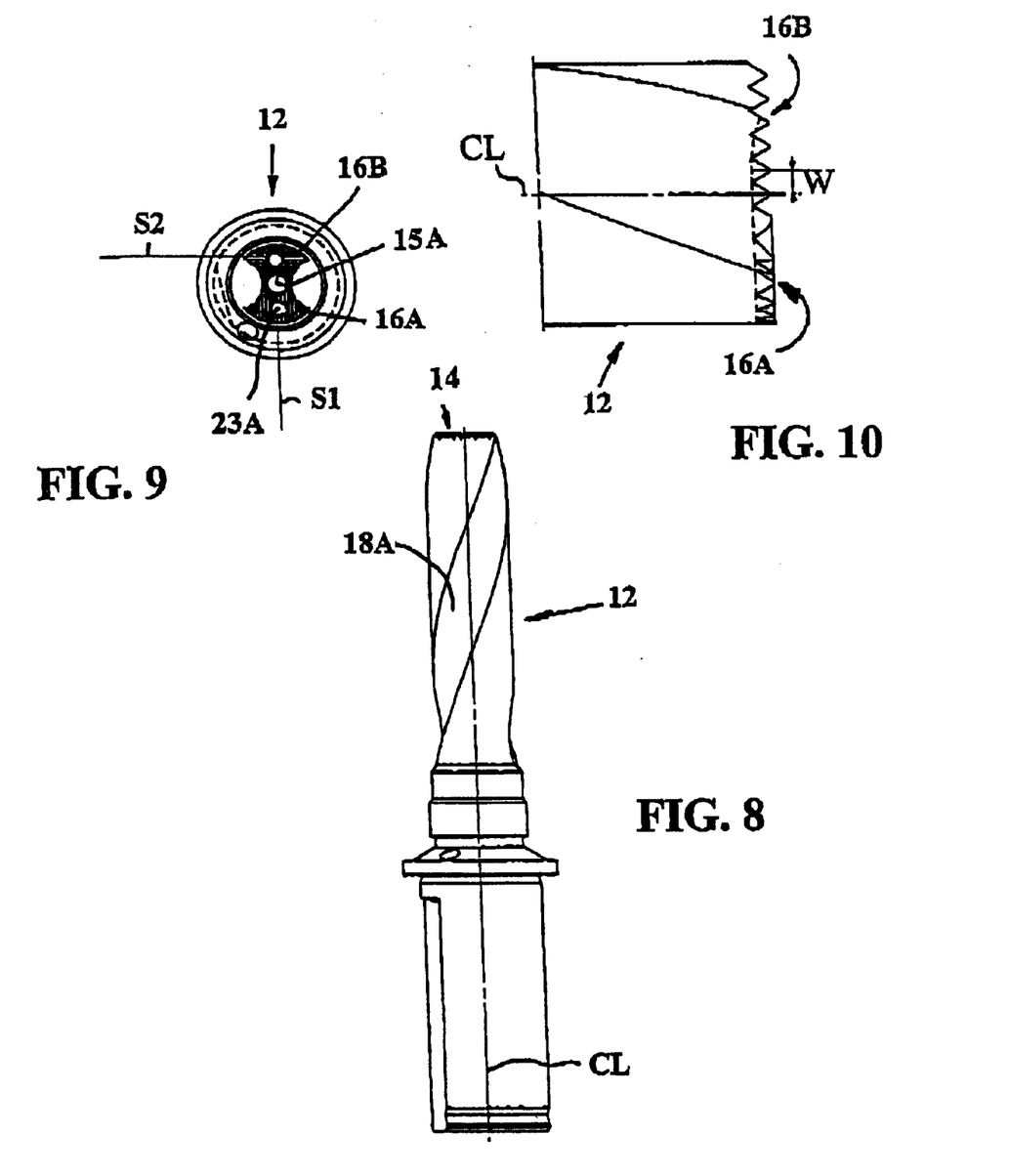
FIG. 8 shows a drill body according to the present invention in a side view.
FIG. 9 shows the drill body in a top vie.
FIG. 10 shows an end of the drill body in an enlarged side view.

In the embodiment shown in FIG. 9 the first groove part 16b has been made by a hobbing or grinding tool, with a feed direction parallel with the direction S2. Subsequently the second groove part 16A has been machined by the same tool in a direction parallel with the direction S1. To obtain full depth in each groove in the second groove part 16A it is appropriate that the tool is fed somewhat into the first groove part 16B. Then said tool will also machine material of the first groove part 16B, which appears, for example in FIG. 9, wherein completely or partly pyramid-shaped projections are formed at the termination of the second groove part 16A in the first groove part 16B. In the shown embodiment the area of the second groove part 16A is somewhat bigger than the area of the first groove part 16B. When mounting the tool tip, the grooves in the groove parts in the tool body and the tool tip are adapted such that the flush channels and the chip flutes are aligned with each other in the respective parts.

Mounting of the tool tip 10 on the tool body 12 is done as follows. The pull rod 11 is brought into a boring in the shank portion and centrally through the tool body 12 until the forward portion of the pull rod projects forwardly from the front surface 14. Then the spring 51 is inserted and the stop screw 52 is threaded inwardly. Said mounting of the pull rod is essentially a one-time event since the user normally only later needs to change the tool tip. Subsequently the threaded end surface is brought into the recess 25 whereafter the tool tip is rotated and is threaded onto the pull rod. Then the support surface 22 of the tool tip is brought by hand into contact with the front surface 14 such that the grooves in the groove parts in the tool body 12 and the tool tip 10 and flush channels and the chip flutes become aligned with each other. The tool tip 10 will be drawn firmly against the front surface by rotating the looking screw 50, i.e. the position according to FIG. 1 has been achieved. The tool tip 10 is now anchored to the tool body 12 in a satisfactory manner. The pull rod in this position is substantially intended to retain the tool tip in place upon retraction of the tool from the machined hole, whereas the ridges and the grooves transmit the forces and the torque which is created during chip removal. The force from the pull rod however, is large enough to avoid play at the joint between the tool tip and the body during retraction of the tool.

In this connection it shall be pointed out that the threaded connection between the tool tip and the pull rod has two purposes, namely to place the tool tip 10 in a fixed position on the tool body during mounting, and during use of the cutting the tool, to always ensure that the tool tip 10 is held in its fixed position.

When the tool tip 10 shall be exchanged, the mounting procedure is reversed, whereby the tool tip 10 can be removed from the tool body 12 and be exchanged.

Figure 15:
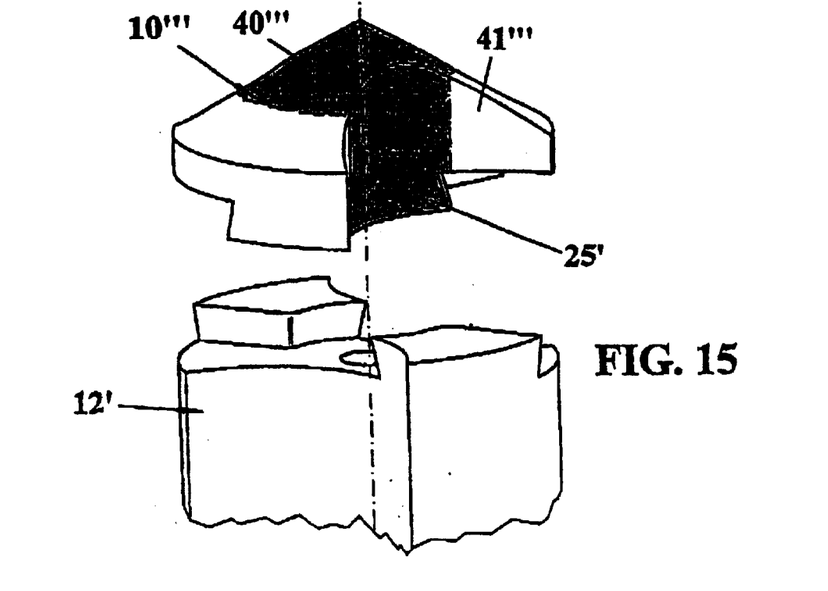
FIG. 15 shows still an alternative embodiment of a tool end according to the present invention in an exploded view.

The present invention is applicable also for milling cutters. Layers of, for example $Al_2O_3$, TiN and/or TiCN, preferably coat the tool tip. In certain cases it can be well founded to braze super hard material such as CBN or PCD on the cutting edges. Likewise it is possible to use clamping means other than a central pull rod; for example it is possible to retain the tool tip by means of a bayonet coupling such as indicated in Berglund et al. U.S. Pat. No. 5,988,953 or as shown in FIG. 15.

In addition shall be pointed out that the above described embodiments relate to tools which rotate relative to their longitudinal axis or the center axis of the workpiece and that the means for retention rotates with the tool. The embodiments can be kept stationary during use in a system wherein the work piece rotates.

So far the present disclosure has described prior art substantially as disclosed in WO99/00208. A new feature of the tool and the tool tip according to the present invention is to provide a rigid tool preferably for drilling or milling where the radially external portion of the tool tip, which is subjected to relatively high cutting speed, has a better wear resistance than the radially inner portion of the tool tip in which is formed the coupling structure that connects to the tool body. That is, the radially outer potion is formed of a brittle hard material, whereas the radially inner portion is formed of a tough hard material, which endures high tensions. This is attained by filling a first injection mold 60 (FIGS. 11–12) via an inlet 62 with a first mixture under high pressure and certain temperature, about 180° C. The mold comprises a cylindrical or elliptical cavity when the tool tip has an appearance according to FIG. 5 and FIG. 6, respectively, and a centrally placed, externally threaded spigot 65.

Figures 11, 12:
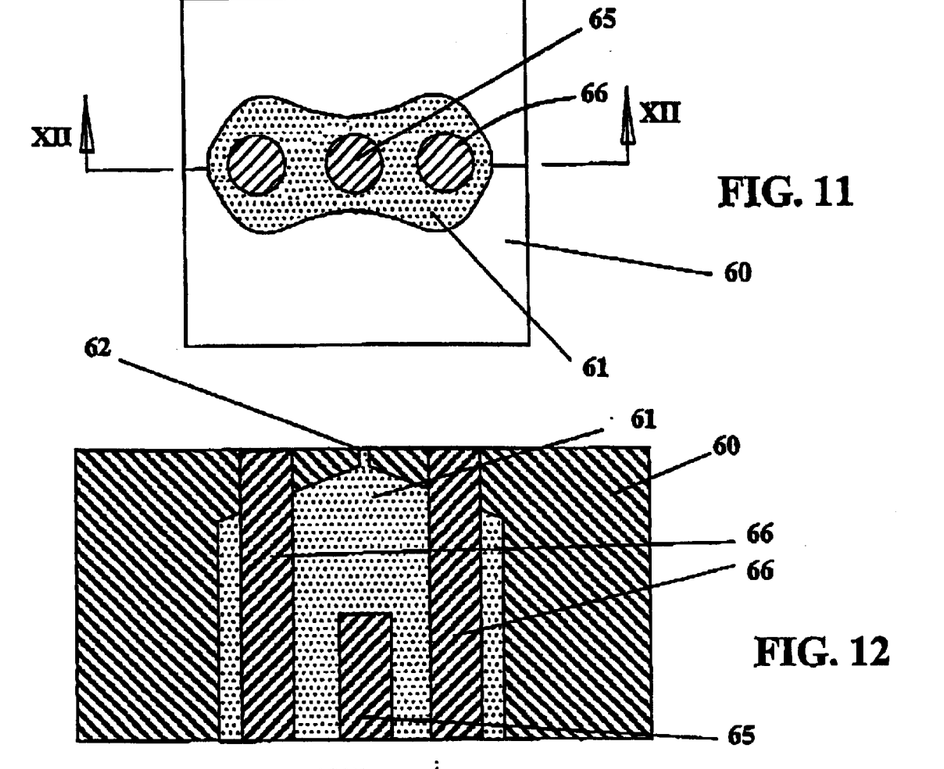
FIG. 11 shows a device in a bottom view for manufacturing of a tool tip according to the present invention.
FIG. 12 shows a cross-sectional view according to the line XII—XII in FIG. 11.
Figure 13:
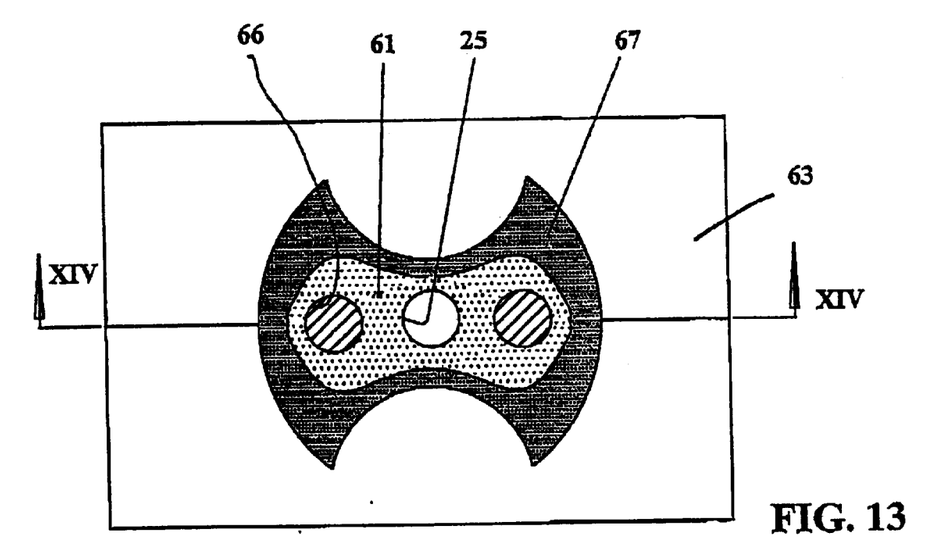
FIG. 13 shows the device in a second manufacturing step in a cross-section corresponding to FIG. 11.

The method is explained more closely with reference to FIGS. 11–13 in which is shown an additional alternative embodiment of a tool tip 41" (FIG. 7), according to the present invention. In this embodiment the contour of the cavity has the appearance of a peanut or hour-glass, in a bottom view according to FIG. 11, to form a core 61 which contains the flushing holes 23 and the blind hole 25. The mold 60 includes an externally threaded spigot 65 that forms the threaded blind hole 25. The flushing holes and the blind hole are formed when the spigot and somewhat conical core pins 66 are surrounded by the liquid mixture during the first phase of the injection molding process. The mixture comprises hard metal powder with relatively high cobalt content and a binder, for example plastics, which is mixed and shaped into pellet form or granulate form. Thereby a core 61 including flushing holes 23 and an internal thread 25 is created.

Figure 14:
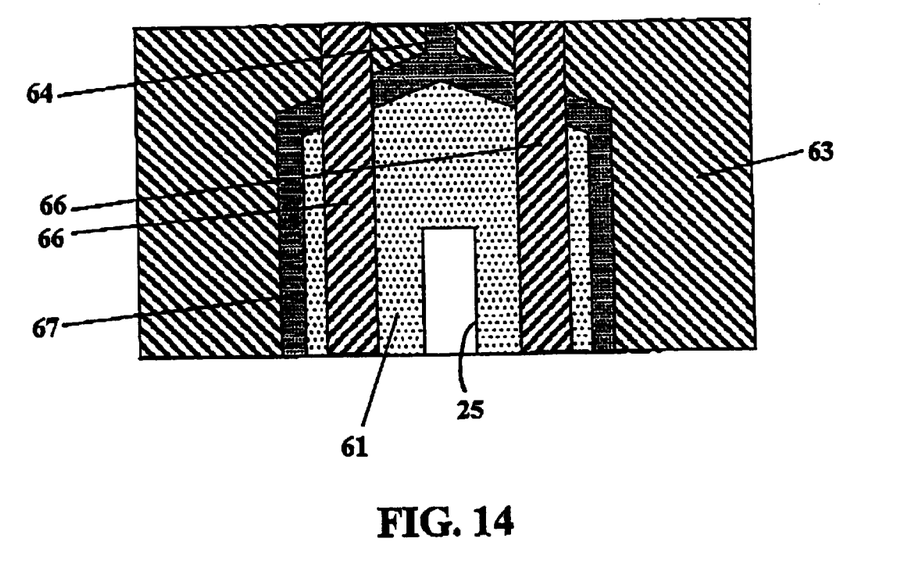
FIG. 14 shows the device at the second step in a cross-section according to the line XIV—XIV in FIG. 13.

The core 61 is then, after cooling, surrounded by a second injection mold 63, FIGS. 13 and 14, preferably by replacing the two first jaws used during the first injection with new jaws. The second mold 63 includes portions for forming chip flutes and the other parts of the tool tip. The conical core pins 66 are used for fixing the insert during the second injection. Consequently the core 61 is fixed centrally in the second mold whereafter a second mixture 67 is injected via the inlet 64 into the second mold. The second mixture 67 differs from the first mixture foremost in the amount of cobalt being less in the second mixture. The difference in metallic binder lies within the interval of 1–10 weight percent units. By the term "cobalt" shall here be understood a metallic binder which alternatively can be exchanged for or include other metals, for example nickel, Ni.

Furthermore, the existing machine can be used by changing only the form providing jaws from the first injection. This is a good manufacturing solution since the core pins can accompany the core 61 and position the core during its subsequent treatment. In the position according to FIG. 14 the threaded spigot 65 is not needed. After cooling, a blank for a tool tip will have been obtained, which after sintering forms a tool tip of at least two hard metal grades after grinding of cutting edges 19 and a chisel edge 24. The tough hard core 61, after being sintered, defines the inner portion 40" while the brittle hard second mixture 67 constitutes the external portion 41". The plastic binder is first removed from the shaped part, and the resulting compact is then sintered. The lower side of the tool tip is machined to form the above-described waffle pattern 22.

Furthermore, with the assistance of this method the tool tip geometry can be chosen independently of the limitations of the conventional form-pressing method. Chip breakers, for example, can be formed on surfaces that until now only have been possible to grind.

Figure 5:
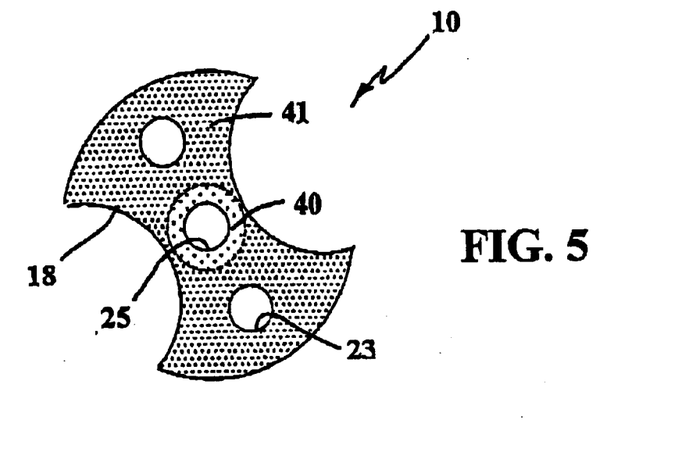
FIG. 5 shows a cross-sectional view according to the section line V—V in FIG. 3.
Figure 6:
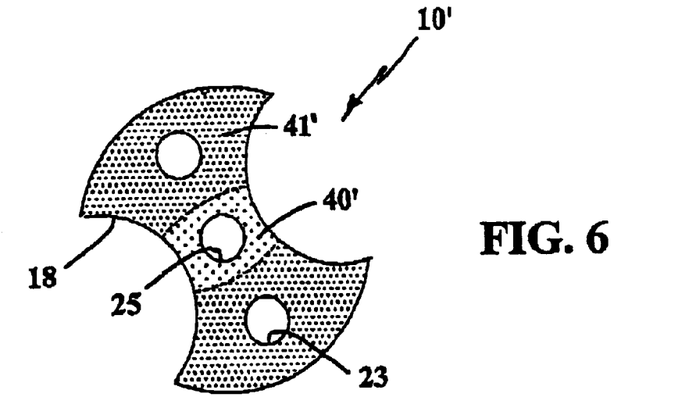
FIG. 6 shows a cross-sectional view according to FIG. 5 of an alternative embodiment of a tool tip according to the present invention.
Figure 7:
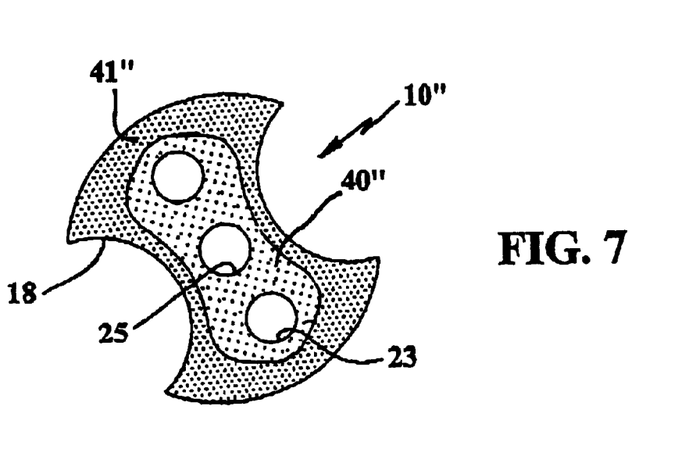
FIG. 7 shows a cross-sectional view according to FIG. 5 of still an alternative embodiment of a tool tip according to the present invention.

FIG. 15 shows still an alternative embodiment of a drill according to the present invention. The drill has a drill body 12' and a drill tip 10'". The body and the tip are connected to each other via coupling structures that form a known bayonet coupling. The inner portion 40'" of the tool tip 10'" is made from the tougher cemented carbide material since that portion comprises a projection 25' defining relative sharp concave corner portions. The tougher material is shaded in FIG. 15. A more wear-resistant cemented carbide material 41'" is positioned radially outside the tougher cemented carbide material as discussed above. The tool tip 10'" can be provided with flush channels. It is understood that although the cross-section of the drill in FIG. 15 resembles the cross-section of FIG. 6, it could very well be made as shown in FIGS. 5 or 7.

Consequently the tool tip contains at least two hard metal grades, i.e., a tough, less wear-resistant grade in the inner portion 40–40'" and a more brittle, more wear resistant grade in the external portion 41–41'". The tool tip is manufactured by injection molding and the at least two grades have the same shrinkage, and therefor problems with cracks in the external portion or porosity in the inner portion, which may arise by conventional pressing, are eliminated. The tool tip has been shown in four alternative embodiments, i.e., two tips (FIGS. 5 and 7) having an internal core, entirely surrounded by the external portion except in the feed direction and the retraction direction, and two tips (FIGS. 6 and 15) having a through-going central portion, not entirely surrounded by the external portion. The difference in cobalt content between the inner portion and the external portion lies in the range of 1–10% by weight. The inner portion is made of a material with 6–20% by weight cobalt while the material in the external portion contains 5–15% by weight cobalt. In two of the embodiments the inner portion 40, 40' does not reach the flush channels 23. The fourth embodiment (FIG. 15) does not include flush channels at all. The central portion of the tool tip is formed of a tougher hard metal than the outer portion such that its thread 25 or protrusion 25' will endure high tensions and such that its cutting forward end 21 such as the chisel edge 24 will endure low cutting speed.

The invention is in no way limited to the above described embodiments but can be varied freely within the scope of the appended claims.

What is claimed is:

1. A rotary chip-removing tool, comprising:
   a tool tip including a body having a front end forming an integral cutting edge, and a rear end forming a support surface having a first coupling structure;
   a rotary tool body defining an axis of rotation, with a second coupling structure disposed at a front end of the tool body in engagement with the first coupling structure for fastening the rear end of the tool tip against the front end of the tool body;
   a first portion of the tool tip possessing at least part of the cutting edge and formed of a first material, and a second portion of the tool tip possessing the first coupling structure and formed of a second material, the first material being more brittle than the second material; and the second material being tougher than the first material.

2. The tool according to claim 1 wherein the first coupling structure comprises a blind hole having an internal screw thread, and the second coupling structure comprising a threaded rod mounted in the tool body and connected in the blind hole.

3. The tool according to claim 1 wherein the first coupling structure comprises a first portion of a bayonet coupling, and the second coupling structure comprises a second portion of the bayonet coupling.

4. The tool according to claim 1 wherein part of the cutting edge is formed by the second material.

5. The tool according to claim 4 wherein the second material is disposed in a central region of the tool tip and extends along the axis of rotation completely through the first material from the front end to the rear end of the tool tip.

6. The tool according to claim 1 wherein the second material is at partially surrounded by the first material.

7. The tool according to claim 6 wherein the second material is surrounded by the first material except at front and rear ends of the tool tip.

8. The tool according to claim 1 wherein the second portion of the tool tip has a generally elliptically shaped cross section, part of which intersects an outer periphery of the tool tip, and part of which is surrounded by the first material.

9. The tool according to claim 1 wherein the tool tip has a front section of a flush channel extending therethrough, and the tool body has a rear section of the flush channel disposed in alignment with the first section, the second material of the tool tip forming both the first coupling part and the front section of the flush channel.

10. A tool tip for rotary chip removal, comprising an injection molded body defining a central axis of rotation and including front and rear ends, the front end forming an integral cutting edge, the rear end including a coupling structure adapted to couple the tool tip to a tool body, a first portion of the body possessing at least part of the cutting edge and formed of a first material, and a second portion of the body possessing the coupling structure and formed of a second material, the first material being more brittle than the second material, and the second material being tougher than the first material.

11. The tool tip according to claim 9 wherein the coupling structure comprises a hole.

12. The tool tip according to claim 10 wherein the hole comprises a blind hole and includes an internal screw thread.

13. The tool tip according to claim 9 wherein the coupling structure comprises a rearward projection.

14. The tool tip according to claim 12 wherein part of the cutting edge is formed of the second material.

15. The tool tip according to claim 9 wherein the second portion of the body extends completely through the tool tip along the axis from the front end to the rear end.

16. The tool tip according to claim 9 wherein the second portion of the body extends partially through the tool tip along the axis from the rear end to a location spaced rearwardly from the front end.

17. The tool tip according to claim 9 wherein the body further includes a flushing channel extending from the rear end to the front end and disposed in the second portion.

* * * * *